June 22, 1954   E. A. ODIN   2,681,784
CAMERA MOUNTING HEAD
Filed Dec. 22, 1949
Fig. 1.
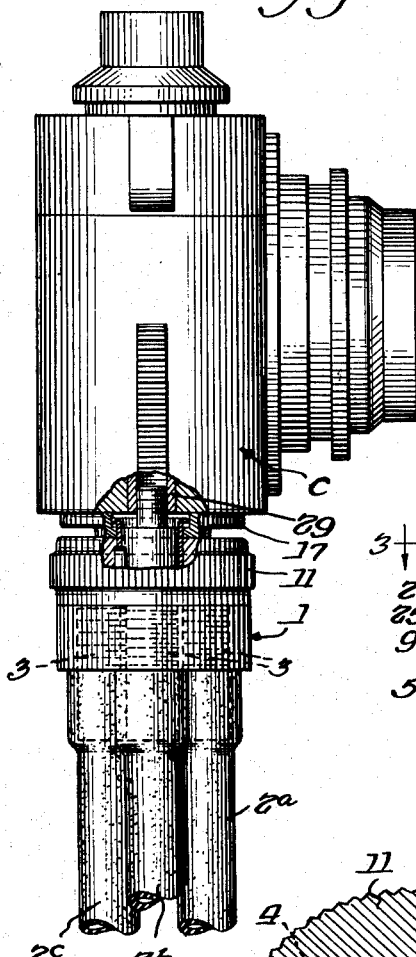
Fig. 2.
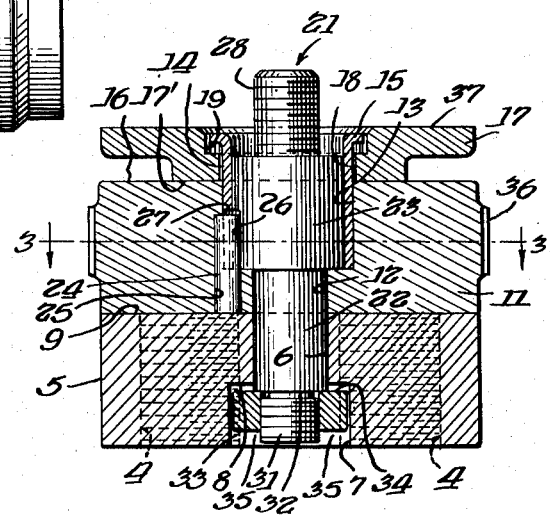
Fig. 3.
Inventor.
Eugene A. Odin.
By Fiee & Fiee
Attys.

Patented June 22, 1954

2,681,784

UNITED STATES PATENT OFFICE 2,681,784

CAMERA MOUNTING HEAD

Eugene A. Odin, Chicago, Ill.

Application December 22, 1949, Serial No. 134,435

2 Claims. (Cl. 248—186)

The invention relates generally to a mounting structure, and more particularly to a mounting head for use in supporting a camera, or other objects.

The invention has among its objects the production of a mounting head which may be employed, for example, in conjunction with a tripod structure, or the like, for securing a camera to the tripod, which mounting head is simple in construction, attractive in appearance, relatively inexpensive to manufacture, and very efficient and durable in use.

Another object of the invention is the production of such a mounting head in which the object to be supported thereby may be readily locked in any desired relative position with respect to the head.

A further object of the invention is the production of such a head which may be provided with a threaded stem adapted to engage a co-operable fitting on the object to be supported, in which the effect of the locking torque of the threaded stem on the camera, or other object, is reduced to a minimum, thereby reducing the tendency of the camera, or other object, to rotate relative to the supporting head as the object is being rigidly clamped thereto.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters indicate like or corresponding parts:

Fig. 1 is a side elevational view of a portion of a tripod structure with a camera positioned on the supporting head, portions of the head and camera being broken away;

Fig. 2 is an axial sectional view of the mounting head taken approximately on the line 2—2 of Fig. 3; and Fig. 3 is a transverse sectional view taken approximately on the line 3—3 of Fig. 2.

The present invention is particularly adapted for use as a means of mounting a camera, or the like, to a tripod structure, and Fig. 2 of the drawings illustrates this application of the invention, the head being disclosed in conjunction with a tripod structure, only the upper portion of which is illustrated.

Referring to the drawings, 1 indicates generally a mounting head to which are secured the upper ends of legs 2a, 2b, and 2c, the latter being of any suitable construction and secured to the head by threaded studs 3 carried by the respective legs and threaded into corresponding internally threaded bores 4 in a base member 5 of the mounting head. The base member 5 is cylindrical in shape and provided with a concentric bore 6 therein, the lower end of the bore 6 terminating in a counterbore 7 to form an annular, internal shoulder 8 in the base member 5.

Positioned on the flat upper face 9 of the base member 5 is an actuating member or collar 11, cylindrical in shape and having a concentric bore 12 therein adapted to be aligned with the bore 6 in the base member 5. The upper end of the bore 12 is formed with a counterbore 13 in which is positioned a tubular sleeve 14, the latter being provided adjacent its free end with an outwardly extending, peripheral flange 15.

Positioned on the upper face 16 of the actuating member 11 is a clamping disc or member 17, having a boss or shoulder 17', of less diameter than that of the disc body, which bears against the face 16. The member 17 is also provided with a bore 18 therein axially aligned with and slightly larger in diameter than that of the counterbore 13 in the member 11, and a counterbore 19 of a size to receive the peripheral flange 15 of the sleeve 14, the latter being of a size to be positioned in the counterbore 13 and secured to the actuating member 11 by means of a press fit, or the like. The clamping disc 17 is thus free to rotate relative to the clamping member 11, but axial movement of the disc relative to the member 11 is restricted. Positioned in the bores 6 and 12 and in the sleeve 14 is a stud member, indicated generally by the numeral 21, provided with a portion 22 of relatively small diameter, and a portion 23 of relatively large diameter positioned in the sleeve 14, with the diameters of the portions 22 and 23 being slightly less than the respective diameters of the bores 6 and 12 and the internal diameter of the sleeve 14, whereby the member 21 may be snugly positioned in the sleeve 14 and bores 6 and 12, but is freely rotatable therein. Relative rotation between the stud 21 and the actuating member 11 is prevented by a pin 24 positioned in a bore 25 in the member 11, the pin extending upwardly into a semicylindrical groove 26 in the portion 23 of the stud, the groove 26 being complementary to the extension of the bore 25 located adjacent the bore 13, with the sleeve 14 having a notch 27 therein of a size to receive the pin 24, the latter thus forming a key between the stud 21 and the member 11.

The upper end of the stud 21 may be provided with any suitable means, such as the externally threaded portion 28, for engagement with a cooperating portion of the object to be mounted, and assuming the head is employed on a tripod as illustrated, the threaded portion 28 would be of a size to fit a standard, internally threaded, female connection 29 on the camera C. The opposite end of the stud 21 is provided with a threaded portion 31 of less diameter than that of the portion 22 to form a shoulder 32 upon which an internally threaded lock ring 33 may be seated. The portion 22 of the stud 21 may extend downwardly into the counterbore 7 to slightly space the shoulder 32, and thus the inner end face 34 of the lock ring 33, from the adjacent shoulder 8, whereby the stud 21 is free to move axially relative to the base member 5, actuating member 11, and clamping member 17, such movement being very slight and equal to the difference in axial length between the portion 6 of the stud 21 and the corresponding length of the bores 6 and 12.

The device is assembled in the following manner: The clamping disc 17 is positioned on the surface 16 of the actuating member 11, and the sleeve 14 inserted, by means of a suitable tool, into the counterbore 13, being securely held by means of a press fit therebetween, and thereby loosely securing the disc 17 to the member 11. The stud 21 is then inserted into the sleeve 14 and bore 12, with the groove 26 in alignment with the bore 25, after which the pin 24 is inserted into the bore 25, as illustrated. The base member 5 is then positioned upon the portion 22 of the stud extending from the member 11 and the lock ring 33 applied to the threaded portion 31 of the stud, the ring 33 being drawn down and tightly sealed on the shoulder 32 of the stud. To facilitate the application of the ring 33 to the stud, the ring may be provided with two or more radial slots 35 in its outer end face for engagement with a suitable tool.

In use, a camera, or other object, is mounted upon the head by aligning the threaded end 28 of the stud with the cooperating female fitting 29 on the camera, and the member 11 is then rotated in a direction to screw the portion 28 of the stud into the fitting 29, the camera being manually held in the desired position relative to the tripod structure. To facilitate the manual grasping and rotation of the member 11, the exterior peripheral surface of the latter is preferably provided with a corrugated or knurled portion 36. As the stud 21 is drawn into the fitting 29, the stud will move upwardly until the inner face 34 of the ring 33 engages the shoulder 8, thereby restricting further axial movement of the stud relative to the base member 5, and as the bottom or other face of the camera engages the exposed face 37 of the clamping disc 17, compression forces are applied to the disc 17, actuating member 11, and base 5 until the camera and the respective members are all firmly clamped together. It will be noted that as the clamping disc 17, which bears against the camera, or other object, to be supported, is freely rotatable relative to the actuating member 11 and the comparatively small area of frictional contact between the boss 17' and the face 16, relatively little locking torque is transmitted to the disc 17 and the camera, thereby materially reducing any tendency of the camera to rotate relative to the base member as it is being mounted. Thus in mounting the camera, the threaded stud 28 is engaged with the fitting 29, and while the camera is manually held in the desired position relative to the base member, the locking member may be rotated to clamp the elements together in such position.

While I have illustrated the stud 21 as being provided with an externally threaded portion 28 engageable with a suitable fitting on the camera, or other object, the portion 28 may be suitably formed to co-operate in the desired manner with other fittings, depending upon the particular application of the invention. It will be apparent from the above disclosure that I have provided a mounting head which is relatively simple in construction, attractive in appearance, and very efficient in operation.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a mounting head for a camera, or the like, a cylindrically-shaped base member having an axial bore therein, a cylindrically-shaped actuating member having an axial bore therein rotatably mounted on said base member, a stud positioned in said bores and axially movable relative to said actuating member, the latter and said stud each having a keyway therein, a pin positioned in said keyways for preventing relative rotation between said stud and actuating member, a clamping disc positioned adjacent said actuating member and freely rotatable relative to the latter and said stud, a sleeve carried by said actuating member and extending through said clamping member, means on said sleeve engageable with said clamping member for limiting relative axial movement therebetween, said stud projecting beyond said clamping member, with the adjacent end thereof provided with threads adapted to engage co-operating threads on an object to be mounted on the head, and a locking member carried by said stud and engageable with said base member for limiting axial movement therebetween.

2. In a mounting head for a camera, or the like, a cylindrically-shaped base member having an axial bore therein and a counterbore therein adjacent its lower end face, a cylindrically-shaped actuating member having an axial bore therein rotatably mounted on the upper face of said base member, said actuating member having a counterbore therein adjacent the upper face thereof, a sleeve positioned in the counterbore of said actuating member and extending outwardly therefrom, a clamping disc positioned adjacent said actuating member, said clamping disc having an axial bore therein through which said sleeve extends, said sleeve having an external shoulder thereon engageable with said clamping member for limiting relative axial movement therebetween, but permitting rotation of said disc relative to the sleeve, a stud positioned in said bores and sleeve and axially movable relative to said actuating member, said stud having a shoulder engageable with the shoulder formed by the counterbore in said actuating member, the latter and said stud each having a keyway therein, a pin positioned in said keyways for preventing relative rotation between said stud and actuating member, said stud projecting beyond said clamping member, with the adjacent end thereof provided with external threads adapted to engage co-operating internal threads on an object to be mounted on the head, and a locking member threaded on said stud and engageable with the shoulder formed by the counterbore in said base member for limiting axial movement therebetween.

References Cited in the file of this patent

UNITED STATES PATENTS

| Number | Name | Date |
| --- | --- | --- |
| 1,386,664 | Vaeth | Aug. 9, 1921 |
| 1,534,407 | Mitchell | Apr. 21, 1925 |
| 2,226,827 | Moore | Dec. 31, 1940 |
| 2,297,927 | Whitman | Oct. 6, 1942 |
| 2,538,640 | Click | Jan. 16, 1951 |